(12) United States Patent
Hopp

(10) Patent No.: US 7,933,705 B2
(45) Date of Patent: Apr. 26, 2011

(54) METHOD AND SYSTEM FOR CONTROLLING OPERATION OF A TRANSMISSION LOCKUP CLUTCH

(75) Inventor: Christopher Hopp, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 785 days.

(21) Appl. No.: 11/872,210

(22) Filed: Oct. 15, 2007

(65) Prior Publication Data
US 2009/0099741 A1 Apr. 16, 2009

(51) Int. Cl.
*G06F 7/00* (2006.01)
(52) U.S. Cl. ............... 701/54; 701/86; 477/77; 477/181
(58) Field of Classification Search .................. 701/54, 701/84, 86; 477/176, 77, 166, 168, 171, 477/173, 178, 180, 181
See application file for complete search history.

(56) References Cited

U.S. PATENT DOCUMENTS

| | | | | |
|---|---|---|---|---|
| 5,480,363 | A * | 1/1996 | Matsubara et al. | 477/63 |
| 5,562,571 | A * | 10/1996 | Maruyama et al. | 477/174 |
| 5,733,223 | A * | 3/1998 | Matsubara et al. | 477/175 |
| 5,807,209 | A * | 9/1998 | Matsubara et al. | 477/176 |
| 5,816,979 | A * | 10/1998 | Shiiba et al. | 477/176 |
| 6,334,835 | B1 * | 1/2002 | Tanaka et al. | 477/205 |
| 6,709,364 | B2 * | 3/2004 | Eguchi et al. | 477/174 |
| 6,719,664 | B2 * | 4/2004 | Ito et al. | 477/176 |
| 7,011,603 | B2 * | 3/2006 | Kobayashi et al. | 477/62 |
| 7,490,588 | B2 * | 2/2009 | Kimura et al. | 123/325 |
| 2003/0045400 | A1 * | 3/2003 | Ito et al. | 477/176 |
| 2003/0050150 | A1 * | 3/2003 | Tanaka et al. | 477/62 |
| 2004/0092362 | A1 * | 5/2004 | Ayabe et al. | 477/62 |
| 2006/0073937 | A1 * | 4/2006 | Tohta et al. | 477/62 |

* cited by examiner

*Primary Examiner* — Mark Hellner
*Assistant Examiner* — Helal A Algahaim
(74) *Attorney, Agent, or Firm* — Mark E. Duell, Esq.; Emerson Thomson Bennett

(57) ABSTRACT

A method of controlling a reduction of an amount of fuel supplied to an engine provided to a motor vehicle with an automatic transmission separated from the engine by a torque converter is provided. The method includes the step of sensing commencement of a deceleration state during which an amount of the fuel supplied to the engine is to be reduced to an amount that is less than an amount of fuel being delivered to the engine immediately prior to the deceleration state. Whether synchronization of an engine output shaft and a transmission input shaft is appropriate under the deceleration stat is also to be determined. Frictional engagement is to be established between mating surfaces in cooperation with the engine output shaft and the transmission input shaft, and a first compressive lockup force is to be established between the mating surfaces during a first time period to urge synchronization of the engine output shaft and the transmission input shaft, wherein the first time period ends before said synchronization is accomplished. A second compressive lockup force is also to be established between the mating surfaces during a second time period after the first time period and before synchronization is achieved, wherein the second compressive lockup force is less than the first lockup force but sufficient to urge synchronization of the engine output shaft and the transmission input shaft.

9 Claims, 3 Drawing Sheets

METHOD AND SYSTEM FOR CONTROLLING OPERATION OF A TRANSMISSION LOCKUP CLUTCH

I. BACKGROUND OF THE INVENTION

A. Field of Invention

The present invention is directed generally to a method and system for controlling operation of a lockup clutch provided to a motor vehicle's transmission, and more particularly, to a method and system for the control of a clutch for fluid coupling an engine output and a transmission input to maximize fuel efficiency of the motor vehicle when acceleration of the motor vehicle transitions from one state to another state.

B. Description of the Related Art

Traditionally, an automatic transmission has been provided to motor vehicles to transmit the rotational energy generated by the engine to cause rotation of the tires. The automatic transmission has commonly included a set of planetary gears that selectively cooperate with a sun gear under the control of hydraulically controlled frictional engagement elements to rotate the tires at a speed that causes propulsion of the motor vehicle forward at a desired speed. To allow at least partial independence between the engine's rotation and the rotation of the tires, a torque converter is provided as a fluid coupling between the engine output shaft and the transmission. The torque converter transmits torque from the engine at a gradual, increasing rate to the transmission when a driver of the automobile actuates the acceleration pedal of the motor vehicle. And since the torque converter can allow for somewhat independent operation of the engine and transmission, the torque converter also minimizes the shock experienced by occupants of the motor vehicle during sudden acceleration or deceleration states.

A motor vehicle with an automatic transmission, however, achieves less fuel efficiency than a similar motor vehicle equipped with a manual transmission because the automatic transmission is permitted to "slip" with respect to the engine due to the torque converter. In other words, the torque converter allows the output shaft of the engine to rotate at a different speed than the input shaft of the transmission, thereby eliminating a static, direct one-to-one connection between the output shaft of the engine and the input shaft of the transmission. To overcome this drawback, many automatic transmissions are provided with a lockup clutch within the torque converter so that under predetermined driving conditions, the output shaft of the engine and the input shaft of the transmission are directly connected, causing those shafts to rotate at the same angular velocity. Examples of driving conditions during which the lockup clutch is engaged to directly connect the engine's output shaft to the transmission's input shaft include steady cruising where the motor vehicle is neither accelerating nor decelerating, as well as gradual acceleration and deceleration states.

Under abrupt deceleration conditions, such as when the driver completely releases the accelerator pedal for example, the engine's output shaft is urged to suddenly rotate slower than the transmission's input shaft, since the motor vehicle is traveling at approximately the same velocity it was prior to the deceleration. If the pressure at which the lockup clutch is applied is constant when such deceleration occurs, the lockup clutch will slip, thereby allowing the transmission side of the torque converter to rotate faster than the engine side of the torque converter under those driving conditions. Such slippage will prevent termination of the fuel supply to the engine corresponding to the release of the accelerator by the driver until the two sides of the torque converter are once again returned to approximately equal rotational speeds. Prolonging the delay of the fuel supply termination will consume extra fuel unnecessarily, thereby worsening the fuel efficiency of the motor vehicles with automatic transmissions compared to motor vehicles with manual transmissions.

Attempts have been made to shorten the delay before the fuel supply to the engine is terminated following a deceleration condition. Many of these attempts call for the pressure at which the lockup clutch is engaged to be elevated to a peak pressure until the engine and transmission sides of the torque converter are rotating at the same speed. Doing so, however, causes a sudden and temporary interruption in the momentum of the motor vehicle, an experience commonly referred to as "shock," which is felt by the occupants of the motor vehicle. The shock experienced by the occupants of the motor vehicle makes for an uncomfortable ride each time a deceleration condition occurs.

Accordingly, there is a need in the art for a method and system for synchronizing the engine and transmission sides of a torque converter provided to a motor vehicle with an automatic transmission. Such a system and method can minimize shock experienced by occupants of the motor vehicle, while minimizing the delay before the supply of fuel to the engine is terminated following the onset of the deceleration condition.

II. SUMMARY OF THE INVENTION

According to one aspect, the present invention provides a method of controlling a reduction of an amount of fuel supplied to an engine provided to a motor vehicle with an automatic transmission separated from the engine by a torque converter. The method includes the step of sensing commencement of a deceleration state during which an amount of the fuel supplied to the engine is to be reduced to an amount that is less than an amount of fuel being delivered to the engine immediately prior to the deceleration state. Whether synchronization of an engine output shaft and a transmission input shaft is appropriate under the deceleration state is also to be determined. Frictional engagement is to be established between mating surfaces in cooperation with the engine output shaft and the transmission input shaft, and a first compressive lockup force is to be established between the mating surfaces during a first time period to urge synchronization of the engine output shaft and the transmission input shaft, wherein the first time period ends before said synchronization is accomplished. A second compressive lockup force is also to be established between the mating surface during a second time period after the first time period and before synchronization is achieved, wherein the second compressive lockup force is less than the first lockup force but sufficient to urge synchronization of the engine output shaft and the transmission input shaft.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
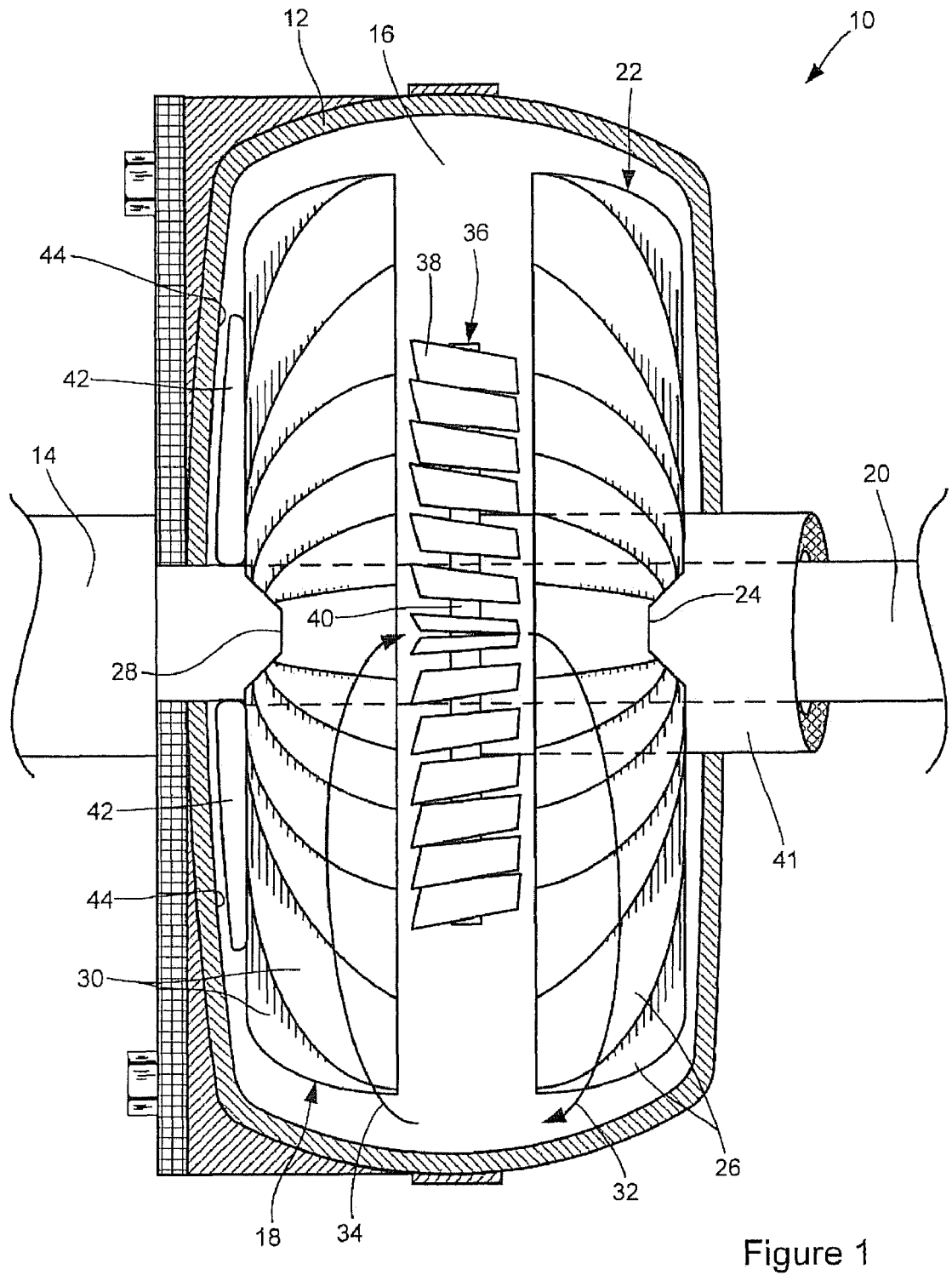
FIG. 1 is a partially cutaway view of a torque converter in accordance with an embodiment of the present invent.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

A partially cutaway view of a torque converter 10, according to an embodiment of the present invention, to be provided to a motor vehicle between an engine and an automatic transmission is shown in FIG. 1. Torque converters provide a fluid coupling between the engine and the automatic transmission to allow for at least partial independent operation thereof. When the motor vehicle comes to a stop, the torque converter allows the transmission to sit idly by while the engine continues to produce a rotational output as necessary to prevent the engine from stalling.

The torque converter 10 includes a housing 12 that is fixedly coupled to a flywheel 14, which is attached to a rotating engine output shaft, commonly referred to as a crankshaft, extending from the engine of the motor vehicle. The crankshaft is the well-known cylindrical shaft that is acted upon, and caused to rotate by reciprocating pistons traveling within the engine under forces exerted by the combustion of a fuel-air mixture within the piston cylinders. The crankshaft extends out of the engine to transfer the rotational force generated by combustion of the fuel-air mixture to the automatic transmission for propelling the motor vehicle.

The rotational force is imparted on the crankshaft primarily as a periodic series of impulses as the pistons are repeatedly subjected to combustion of the fuel-air mixture within the piston cylinders of the engine. To smooth rotation of the crankshaft and achieve a substantially continuous rotation thereof, the flywheel 14 is coupled to the crankshaft externally to the engine. The flywheel 14 is a dense, heavy metal wheel that provides inertia to keep the crankshaft turning smoothly during the periods when no rotational force is being applied thereto (i.e., between combustions of the fuel-air mixture within the cylinders). The housing 12 is coupled to the flywheel 14 so the housing 12 and the flywheel 14 rotate together.

The housing 12 forms a hollow interior chamber 16 in which a substantially incompressible fluid such as an oil is stored. It is this fluid that is acted upon and pumped by a centrifugal type pump impeller 22 for transmitting the rotational motion of the crankshaft to the transmission input shaft 20. The impeller 22 is also coupled to the housing 12 to rotate at the angular velocity of the engine output shaft and flywheel 14. The impeller 22 includes a hollow central hub 24 positioned along a central axis about which the impeller 22 rotates, and a plurality of vanes that extend from the hollow central hub 24 radially outward toward the housing 12. Each vane is defined between a plurality of curved blades 26 that are coupled to the hub 24, and is in fluid communication with the hollow central hub 24. the impeller 18 can be of a closed, semi-open or open variety as appropriate for the particular motor vehicle to which the torque converter 10 is provided.

Likewise, a turbine 18 that is similar to the impeller 22 is rotatably mounted within the chamber 16 defined by the housing 12. Like the impeller 22, the turbine 18 also includes a hollow central hub 28 in fluid communication with a plurality of vanes defined between curved blades 30. The blades 30 are curved to direct the fluid pumped by the impeller 22 from adjacent the interior periphery of the chamber 16 radially inward, toward the hollow central hub 28 of the turbine 18. The flow of the fluid over the blades 30 and toward the hub 28 of the turbine 18 cause the turbine 18 to rotate. And since the transmission input shaft 20 is coupled to the central hub 28 of the turbine 18, rotation of the turbine 18 also causes rotation of the transmission input shaft 20, which in turn rotates the tires and propels the motor vehicle.

Generally, as the impeller 22 rotates, the fluid within the interior chamber 16 of the housing 12 is drawn into the hollow central hub 24 and propelled by centrifugal force radially outward toward the interior periphery of the housing 12 along a path represented generally by arrow 32. The fluid, traveling in this direction enters the blades 30 of the turbine 18 along a flow path represented generally by arrow 34 as it travels generally toward the hollow central hub 28 of the turbine 18. As the fluid exits radially inward of the blades 30 provided to the turbine 18, much of it is traveling in a direction other than perpendicularly toward the central hub 24 of the impeller 22. Striking the impeller 22 traveling in this direction, the fluid would dissipate some of the rotational energy of the impeller 22, thereby hurting the efficiency of the torque converter 10. To minimize the effect of the fluid on the rotational energy of the impeller 22, a stator also includes a plurality of blades 38 mounted to a central hub 40. However, the central hub 40 includes a one-way clutch that couples the stator 36 to a fixed shaft 41 extending from the transmission to only allow rotation of the stator 36 in one angular direction about a central axis. The only permissible angular rotation in which the stator can rotate is in a direction opposite the direction in which the fluid is flowing upon entering the stator 36. This limited rotation of the stator 36 substantially redirects the fluid discharged from the turbine 18 en route to the impeller 22, thereby minimizing the inefficiencies of the torque converter 10 due to the impact on the fluid on the impeller 22.

The torque converter 10 is also equipped with a lockup clutch system that includes one or more lockup surfaces 42 coupled to the central hub 28 of the turbine 18 between the housing 12 and the turbine 18. The lockup clutch utilizes a force-producing member such as a system of springs, a hydraulic cylinder, and the like to assert a lockup force against the turbine 18 to urge the turbine 18 outwardly, generally away from the impeller 22 and toward the housing 12. When the turbine 18 is sufficiently moved, the lockup surfaces 42 contact an inner surface 44 of the housing 12, thereby establishing frictional engagement between the housing 12 and the turbine 18. Since the housing 12 is coupled to the flywheel 14, which is in turn coupled to the engine output shaft, and since the turbine 18 is coupled to the transmission input shaft 20, synchronization of the housing 12 and the turbine 18 also establishes synchronization of the engine output shaft with flywheel 14 and the transmission input shaft 20.

Synchronization of the engine output shaft (represented in the Figures by the flywheel 14) and the transmission input shaft 20 means that the engine output shaft and the transmission input shaft 20 are rotating at approximately the same angular velocity. In such a condition, the engine output shaft and the transmission input shaft 20 are rotating at a 1:1 ratio. Without synchronization, "slip" occurs between the engine output shaft and the transmission input shaft 20. When the engine output shaft is rotating at a greater angular velocity than the transmission input shaft 20, there is less than 100% slip. For example, if the transmission input shaft 20 is rotating at an angular velocity that is only 80% of the angular velocity at which the engine output shaft is rotating, an 80% slip condition exists. Likewise, if the transmission input shaft 20 is rotating at an angular velocity that is 10% greater than the angular velocity at which the engine output shaft is rotating, then a 110% slip condition exists. There is 100% slip when the engine output shaft and the transmission input shaft 20 are rotating at the same angular velocity. An example of 100% slip condition is when there is synchronization between the engine output shaft and the transmission input shaft 20, such as when the lockup clutch frictionally engages and connects the turbine 18 to the housing 12.

Figure 2:
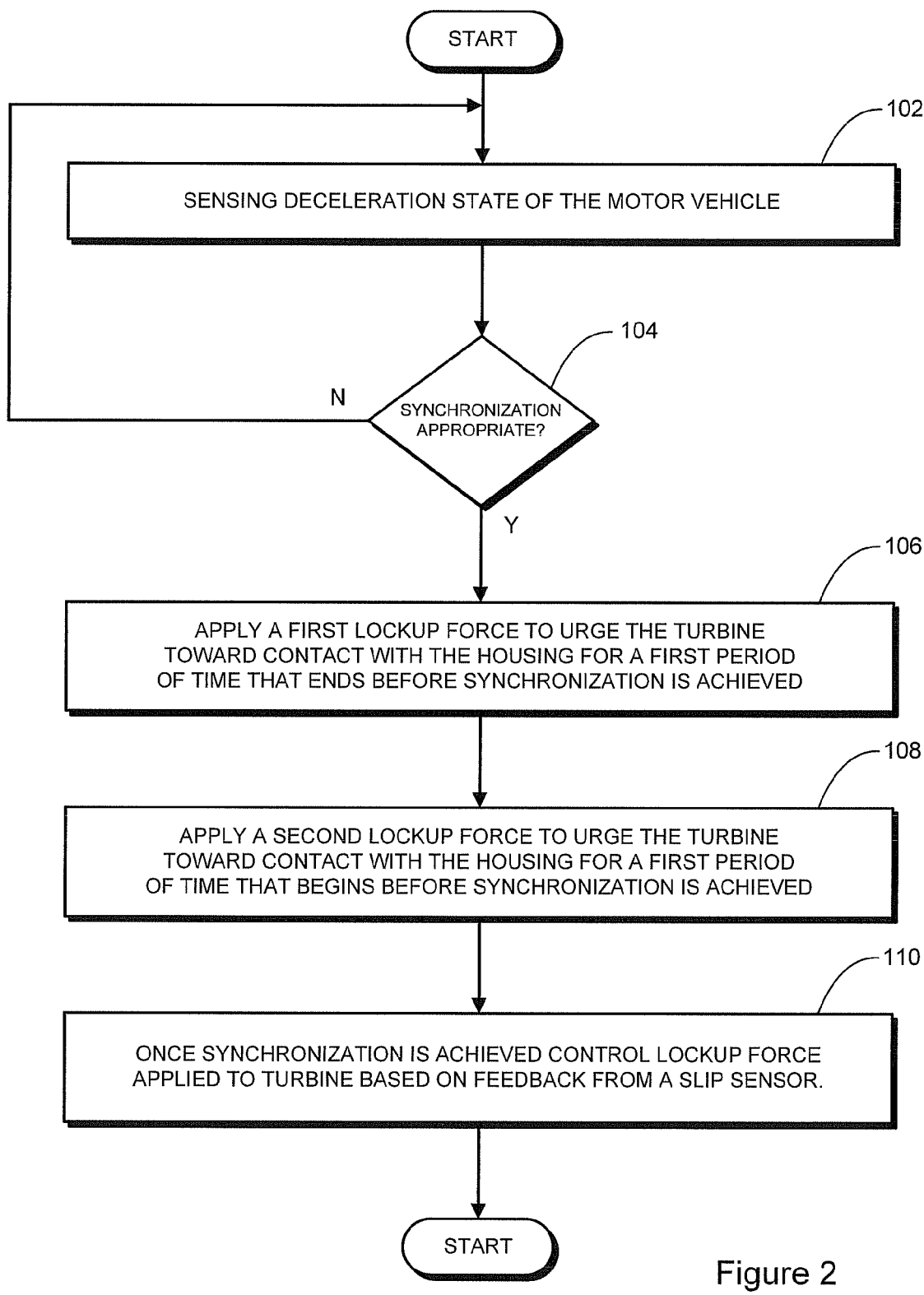
FIG. 2 is a flow diagram illustrating a method according to an embodiment of the present invention.

A flow diagram shown in FIG. 2 illustrates an embodiment of a method of the present invention. As shown, the embodiment is directed generally toward achieving synchronization between the engine output shaft and the transmission input shaft 20 in response to deceleration conditions. More particularly, establishing such synchronization enables a controlled reduction in an amount of fuel supplied to a motor vehicle's engine, where the motor vehicle has an automatic transmission separated from the engine by a torque converter 10. The method includes the step of sensing commencement of a deceleration state during which an amount of the fuel supplied to the engine is to be reduced to an amount that is less than an amount of fuel being delivered to the engine immediately prior to the deceleration state at step 102. Such deceleration states occur when the driver of the motor vehicle releases an accelerator pedal, for example. A sensor can be provided to monitor signals that control a throttle of the motor vehicle to sense the onset of deceleration state.

Not all deceleration states will necessarily call for synchronization of the engine output shaft and the transmission input shaft 20 following a time when the engine output shaft and the transmission input shaft 20 are not synchronized. There are instances of slight deceleration, such as when the motor vehicle is cruising at highway speeds and only wishes to slow by a couple of miles per hour when synchronization already exists. Under such static friction situations, the force with which the lockup surfaces 42 and the inner surface 44 of the housing 12 contact each other is typically sufficient to maintain synchronization. Thus, at step 104, it is determined whether synchronization of an engine output shaft and a transmission input shaft is appropriate under the deceleration state sensed at step 102.

Synchronization is appropriate and desired when the engine output shaft and the transmission input shaft 20 are not already synchronized. An example of a deceleration state in which synchronization is appropriate is a transition from: 1) an acceleration state in which there is no frictional engagement between the mating surfaces and the engine output shaft is rotating at a greater angular velocity than the transmission input shaft, to 2) a slowing state in which the transmission input shaft is rotating at a greater angular velocity than the engine output shaft. This first example occurs when the driver of the motor vehicle presses the accelerator pedal for rapid acceleration and then completely releases it so as to cause the car to experience a significant transition from positive to negative acceleration. In this type of deceleration state, the engine output shaft goes from spinning faster than the transmission input shaft 20, to wanting to rotate slower than the transmission input shaft 20.

Another example of a deceleration state requiring implementation of the synchronization and fuel delivery termination methods of the present invention is when there is a transition from a cruising state to a slowing state. For example, in a cruising state there may be frictional engagement between the mating surfaces, and the engine output shaft may be rotating at approximately the same angular velocity as the transmission input shaft. In contrast, in a slowing state the frictional engagement between the mating surfaces may be insufficient to maintain synchronization between the mating surfaces, and the transmission input shaft may be rotating at a greater angular velocity than the engine output shaft. Accordingly, the force with which the lockup surfaces 42 and the inner surface 44 of the housing 12 contact each other is insufficient to maintain synchronization when the driver of the motor vehicle releases the accelerator pedal. These are two non-limiting examples of when synchronization of the engine output shaft and the transmission input shaft 20 is determined to be appropriate at step 104 to be appropriate.

If, at step 104 it is determined that synchronization of the engine output shaft and the transmission input shaft 20 is appropriate, then frictional engagement between mating surfaces in cooperation with the engine output shaft and the transmission input shaft is established at step 106. A first lockup force is applied to the turbine 18 during a first time period, thereby urging the mating surfaces to contact each other. The first lockup force applied to urge the turbine 18 toward the inner surface 44 of the housing 12 is greater than the lockup force required simply to maintain synchronization, due to the difference between static and kinetic coefficients of friction. The first lockup force can be though of as a purge force, which is temporarily applied to rapidly bring the transmission input shaft 20 close to synchronization with the engine output shaft, but the period of time during which the first lockup force is applied ends prior to actually establishing synchronization. According to alternative embodiments, the first lockup force is applied to the turbine 18 for a period of time until the slip condition reaches about ±10% of a 100% slip condition.

By applying the elevated first lockup force, the engine output shaft and the transmission input shaft 20 are quickly brought towards synchronization, thereby minimizing the delay in achieving synchronization, and accordingly, in minimizing the amount of fuel supplied to the engine. During the first period of time when the first lockup force is applied to the turbine 18, the turbine 18 contacts the inner surface 44 of the housing 12 and the compressive force between the two rapidly rises to a level just short of that required to achieve synchronization. However, the first time period ends before said synchronization is accomplished, and the first lockup force is lowered to a second lockup force at step 108 to more slowly approach synchronization and avoid a sudden shock that would be experienced by occupants of the motor vehicle. The second lockup force is less than the first lockup force, but still greater than the force required to maintain synchronization of the engine output shaft and the transmission input shaft 10, once synchronization is achieved. The first lockup force is lowered to the second lockup force after the first period of time, but before synchronization is accomplished. This second lockup force is applied to the turbine 18 until synchronization is achieved, after which time the lockup force applied to the turbine 18 is determined based on feedback from a slip sensor at step 110. The slip sensor can be any sensor that transmits a signal indicative of a slip condition.

Figure 3:
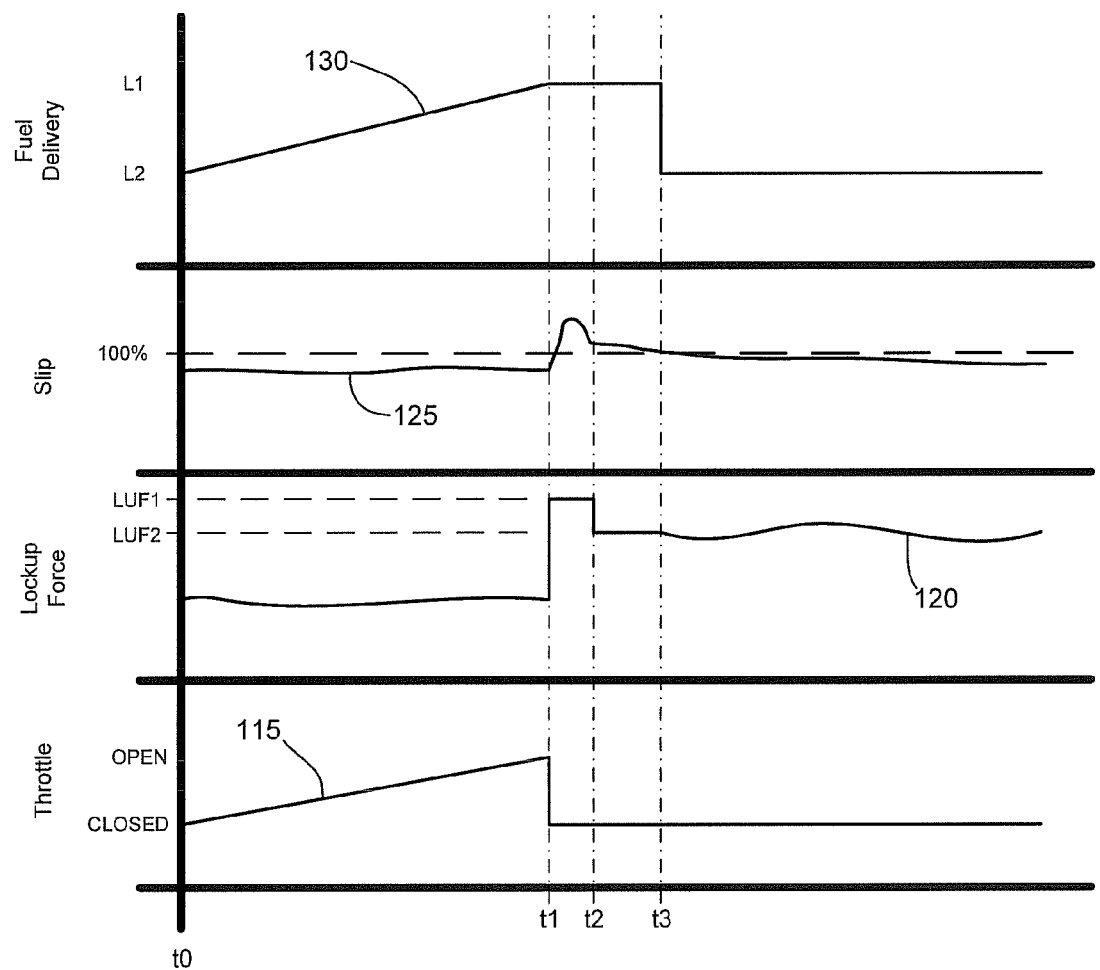
FIG. 3 is a timing diagram illustrating performance of a method in accordance with an embodiment of the present invention.

FIG. 3 is a timing diagram illustrating performance of a method in accordance with an embodiment of the present invention. From time t0 to t1, the driver of the motor vehicle actuates the acceleration pedal, thereby opening the engine's throttle according to trace 114 in FIG. 3 and causing the motor vehicle to accelerate at a desired rate. In this acceleration state, the lockup force is not applied to urge the turbine 18 toward the inner surface 44 of the housing 12, as shown by trace 120. Instead, propulsion of the motor vehicle is accomplished through the flow of the fluid within the propulsion of the motor vehicle is accomplished through the flow of the fluid within the chamber 16 and the interaction of the fluid between the turbine 18 and the impeller 22 as described above. The inefficiencies introduced by the torque converter 10 result in a slip condition of about 90%, meaning that the transmission input shaft 20 is rotating at an angular velocity of about 90% of the angular velocity of the engine output shaft, as shown by trace 125. And while the motor vehicle is accelerating, the amount of fuel delivered to the engine is also increasing according to trace 130.

At time t1, however, the driver of the motor vehicle completely releases the acceleration pedal, thereby commencing in a deceleration state during which the motor vehicle slows. At time t1, the throttle is instructed to return to the closed state, and the first lockup force is applied to urge the turbine 18, and the lockup surfaces 42, into the inner surface 44 of the housing 12. As can be seen from trace 120, the first lockup force jumps to LUF1, which is representative of the compressive force between the lockup surfaces 42 and the inner surface 44 of the housing 12. The lockup force is maintained at the elevated LUF1 level until time t2, at which time synchronization of the engine output shaft and the transmission input shaft 20 is nearly complete, but synchronization has not yet been accomplished. Further, as shown by trace 125, the engine is attempting to rotate the engine output shaft at a slower angular velocity than the transmission input shaft 20 due to the sudden commencement of the deceleration state at time t1. As shown in FIG. 3, it appears that the transmission input shaft 20 is rotating at an angular velocity that is approximately 15% greater than the angular velocity of the engine output shaft. Although the throttle has been instructed to return to the closed state, the amount of fuel delivered to the engine cannot yet be minimized until the slip condition has been stabilized and near synchronization established.

Time t2 represents the end of the first period of time during which the elevated first lockup force LUF1 was applied to the turbine 18, and the start of the second period of time during which the lockup force imparted onto the turbine 18 is reduced from the first lockup force LUF1 to the second lockup force LUF2. Second lockup force LUF2 is sufficient to urge synchronization, and greater than the minimum required to maintain synchronization under steady-state conditions, however, it is not so great so as to subject this manner, final synchronization is gradually achieved at time t3 and the amount of fuel delivered to the engine can be minimized corresponding to the closed throttle deceleration state, resulting in enhanced fuel economy. The amount of fuel being delivered to the engine immediately prior to the deceleration condition and can optionally be substantially terminated.

After time t3 when synchronization is achieved, feedback from the slip sensor can finely adjust the lockup force applied to the turbine 18, if such a force is to be applied at all.

Illustrative embodiments have been described, hereinabove. It will be apparent to those skilled in the art that the above devices and methods may incorporate changes and modifications without departing from the general scope of this invention. It is intended to include all such modification and alterations in so far as the come within the scope of the appended claims.

Having thus described the invention, it is now claimed:

1. A method of controlling a reduction of an amount of fuel supplied to an engine provided to a motor vehicle with an automatic transmission separated from the engine by a torque converter, the method comprising the steps of:

sensing commencement of a deceleration state during which an amount of the fuel supplied to the engine is to be reduced to an amount that is less than an amount of fuel being delivered to the engine immediately prior to the deceleration state;

determining whether synchronization of an engine output shaft and a transmission input shaft is appropriate under the deceleration state;

establishing frictional engagement between mating surfaces in cooperation with the engine output shaft and the transmission input shaft and establishing a first compressive lockup force between said mating surfaces during a first time period to urge synchronization of the engine output shaft and the transmission input shaft, wherein the first time period begins at the commencement of the deceleration state, and wherein the first time period ends before said synchronization is accomplished; and establishing a second compressive lockup force between said mating surfaces during a second time period after the first time period and before synchronization is achieved, wherein the second compressive lockup force is less than the first lockup force but sufficient to urge synchronization of the engine output shaft and the transmission input shaft.

2. The method according to claim 1, wherein the first lockup force is greater than a force required to maintain synchronization of the engine output shaft and the transmission input shaft once synchronization has been achieved.

3. The method according to claim 1, wherein the lockup force is adjusted from the second lockup force according to feedback from a slip sensor after synchronization has been achieved.

4. The method according to claim 1 further comprising the step of reducing the amount of fuel supplied to the engine to an amount that is less than an amount of fuel being delivered to the engine immediately prior to the deceleration condition.

5. The method according to claim 4, wherein the supply of fuel to the engine is substantially terminated.

6. The method according to claim 1, wherein the deceleration state in which synchronization is appropriate is a transition from: a) an acceleration state during which there is no frictional engagement between the mating surfaces and the engine output shaft is rotating at a greater angular velocity than the transmission input shaft, to b) a slowing state during which the transmission input shaft is rotating at a greater angular velocity than the engine output shaft.

7. The method according to claim 1, wherein the deceleration state in which synchronization is appropriate is a transition from: a) a cruising state during which there is frictional engagement between the mating surfaces and the engine output shaft is rotating at approximately the same angular velocity as the transmission input shaft, to b) a slowing state during which the frictional engagement between the mating surfaces is insufficient to maintain synchronization between the mating surfaces and the transmission input shaft is rotating at a greater angular velocity than the engine output shaft.

8. The method according to claim 1, wherein the first time period ends when a slip condition reaches about ±10% of a 100% slip condition.

9. The method according to claim 1, wherein the first lockup force is elevated to quickly bring the engine output shaft and the transmission input shaft towards synchronization, thereby minimizing the delay in achieving synchronization, and thus minimizing the amount of fuel supplied to the engine.

* * * * *